(12) United States Patent
Rados

(10) Patent No.: US 9,047,470 B2
(45) Date of Patent: Jun. 2, 2015

(54) SECURE PROVISIONING OF COMMERCIAL OFF-THE-SHELF (COTS) DEVICES

(71) Applicant: Verizon Patent and Licensing Inc., Basking Ridge, NJ (US)

(72) Inventor: Steven R. Rados, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 112 days.

(21) Appl. No.: 13/651,567

(22) Filed: Oct. 15, 2012

(65) Prior Publication Data

US 2014/0109187 A1   Apr. 17, 2014

(51) Int. Cl.
*G06F 21/00* (2013.01)
*G06F 21/57* (2013.01)
*H04W 4/00* (2009.01)
*H04W 12/08* (2009.01)
*H04W 88/02* (2009.01)

(52) U.S. Cl.
CPC .............. *G06F 21/572* (2013.01); *G06F 21/57* (2013.01); *H04W 4/001* (2013.01); *H04W 12/08* (2013.01); *H04W 88/02* (2013.01)

(58) Field of Classification Search
CPC ............... H04L 9/06; H04L 9/00; H04L 9/30; H04L 9/18; G06F 7/725; G06F 21/00
USPC ....................... 726/4; 713/150–154, 160–167, 713/189–193; 380/28–30, 44–47, 277–283; 709/229
See application file for complete search history.

(56) References Cited

U.S. PATENT DOCUMENTS

| | | | |
|---|---|---|---|
| 7,937,582 B1 * | 5/2011 | Lee ................................ | 713/155 |
| 2009/0181662 A1 * | 7/2009 | Fleischman et al. ........... | 455/419 |
| 2011/0219239 A1 * | 9/2011 | Fahrny ........................... | 713/189 |
| 2012/0079609 A1 * | 3/2012 | Bender et al. ................... | 726/30 |
| 2012/0231764 A1 * | 9/2012 | Lindteigen et al. ............ | 455/410 |
| 2012/0254972 A1 * | 10/2012 | Fulton ............................... | 726/9 |

* cited by examiner

*Primary Examiner* — Evans Desrosiers

(57) ABSTRACT

A device receives identification information associated with a mobile commercial off-the-shelf (COTS) device, and receives configuration and security requirements defined for the mobile COTS device. The device creates secure configuration software for the mobile COTS device based on the identification information and the configuration and security requirements, and provides the secure configuration software to the mobile COTS device for installation.

20 Claims, 11 Drawing Sheets

OVERVIEW

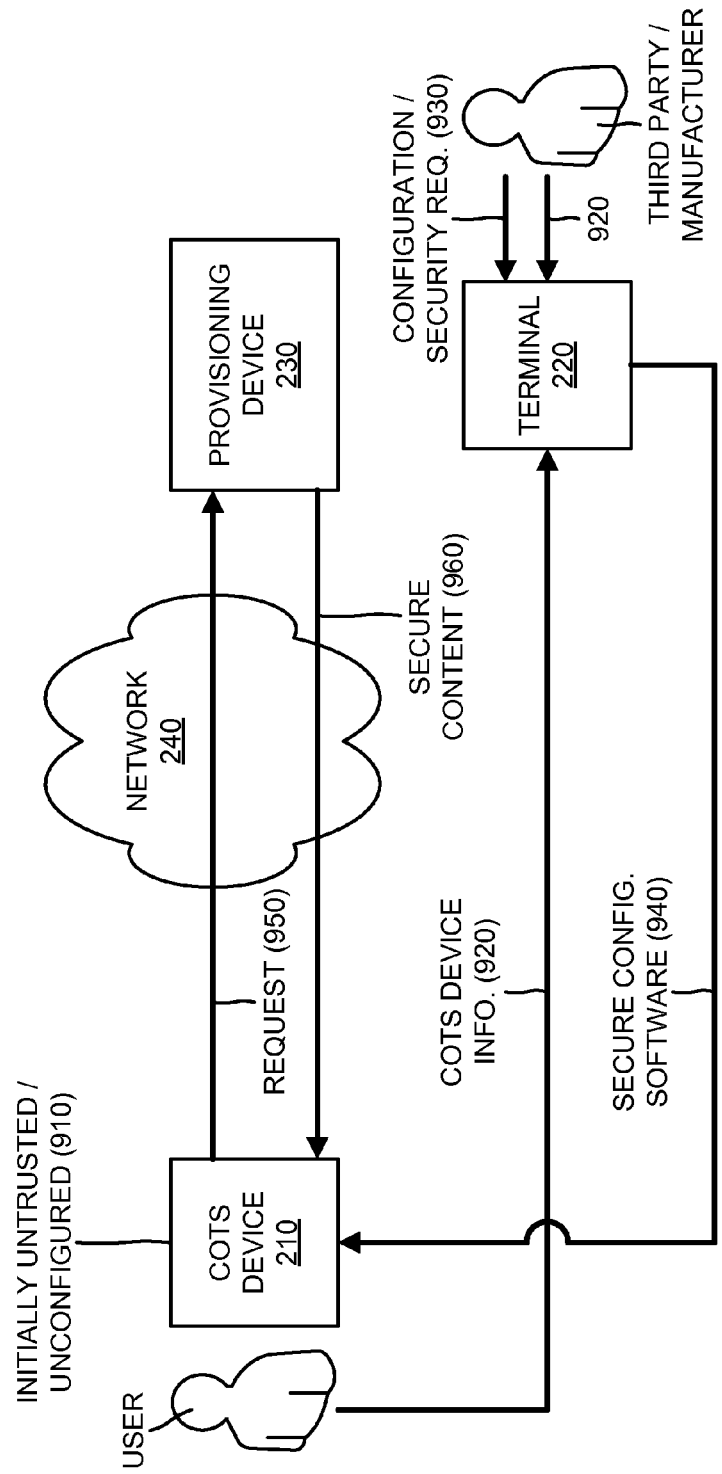

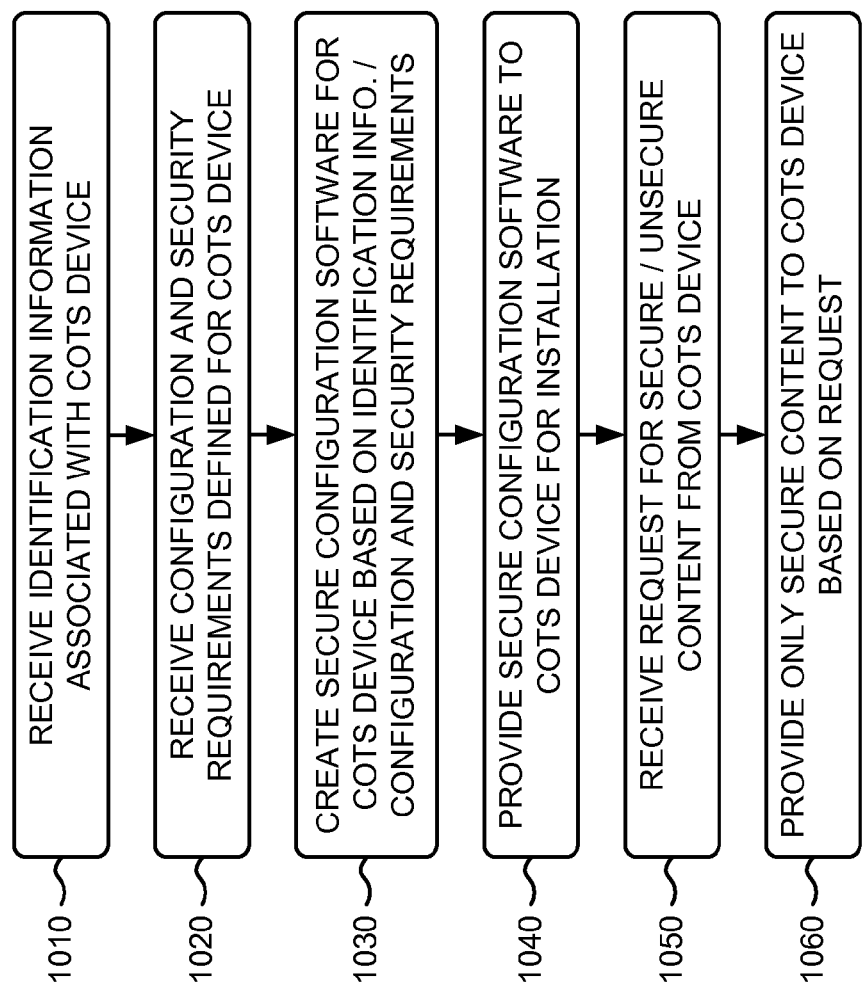

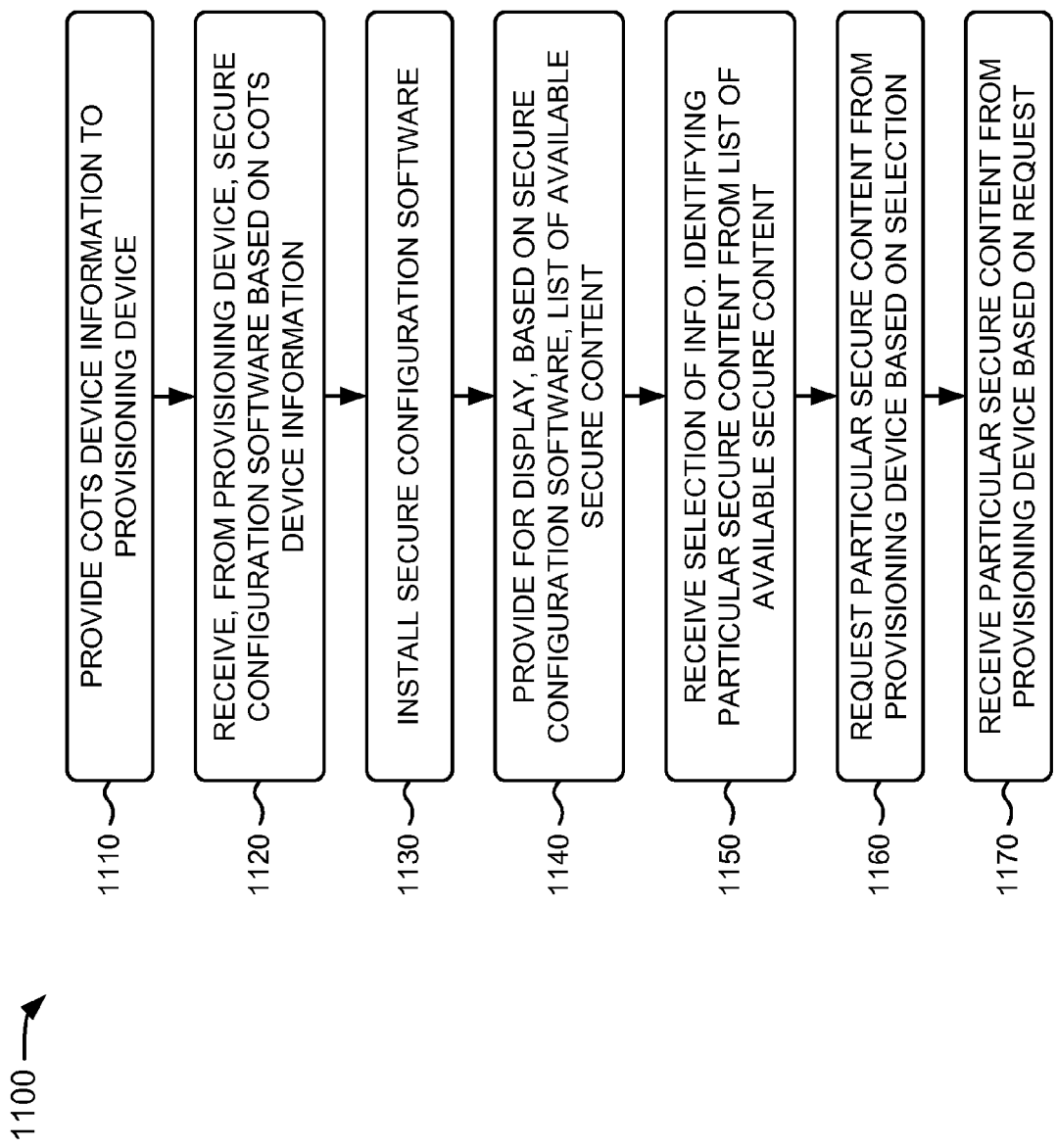

US 9,047,470 B2

SECURE PROVISIONING OF COMMERCIAL OFF-THE-SHELF (COTS) DEVICES

BACKGROUND

Mobile computation and communication devices (mobile devices) can store large amounts of data, are highly portable, and are frequently unprotected. For example, a mobile device is easy to steal or lose. Furthermore, unless precautions are taken, an unauthorized person can gain access to confidential information stored on or accessed through a mobile device. Even if not stolen or lost, an unauthorized person may gain access to the confidential information if the mobile device is left unattended and unprotected, if data is acquired during wireless communications by the mobile device, or if malware is unknowingly installed on the mobile device. This may result in an inoperable mobile device, loss of personal information, disclosure of confidential information, disciplinary actions for the mobile device owner, etc.

Organizations, such as private companies, government agencies, universities, etc. may purchase particular mobile devices for their employees or may require their employees to purchase particular mobile devices. The particular mobile devices may be equipped with safeguards that prevent unauthorized access to organization information stored on the particular mobile devices. However, the particular mobile devices may also include software (e.g., mobile applications) and other features (e.g., navigation, global positioning system (GPS) components, etc.) that organizations may not wish to purchase.

BRIEF DESCRIPTION OF THE DRAWINGS

FIG. 9 is a diagram of example operations capable of being performed by another example portion of the environment illustrated in FIG. 2;

FIG. 10 is a flow chart of an example process for secure provisioning of COTS devices; and FIG. 11 is a flow chart of another example process for secure provisioning of COTS devices.

DETAILED DESCRIPTION OF PREFERRED EMBODIMENTS

The following detailed description refers to the accompanying drawings. The same reference numbers in different drawings may identify the same or similar elements.

A commercial off-the-shelf (COTS) device may include a standardized or generic device that does not include customized hardware and/or software components. For example, a COTS mobile device may include a mobile device that does not include safeguards that prevent unauthorized access to the device, unsecure software (e.g., mobile applications), and other features (e.g., navigation, GPS components, etc.). Due to its generic nature, a COTS mobile device may cost significantly less than a mobile device that includes customized hardware and/or software components. However, a COTS mobile device may include an unsecure configuration that fails to prevent unauthorized access to the device.

Systems and/or methods described herein may enable a COTS device to be securely configured so that the COTS device may become a trusted and secure device. In one example, a user of the COTS device may provide identification information, associated with the COTS device, to an organization associated with the user. The organization may define configuration and security requirements for the COTS device, and may provide the identification information and the configuration and security requirements to a provisioning device. The provisioning device may determine secure configuration software for the COTS device based on the identification information and the configuration and security requirements. The provisioning device may securely provide the secure configuration software to the COTS device, and the COTS device may install the secure configuration software. The secure configuration software may prevent unauthorized access to the COTS device, may remove specific services and/or functions of the COTS device, and may prevent the COTS device from accessing unsecure content.

Figure 1:
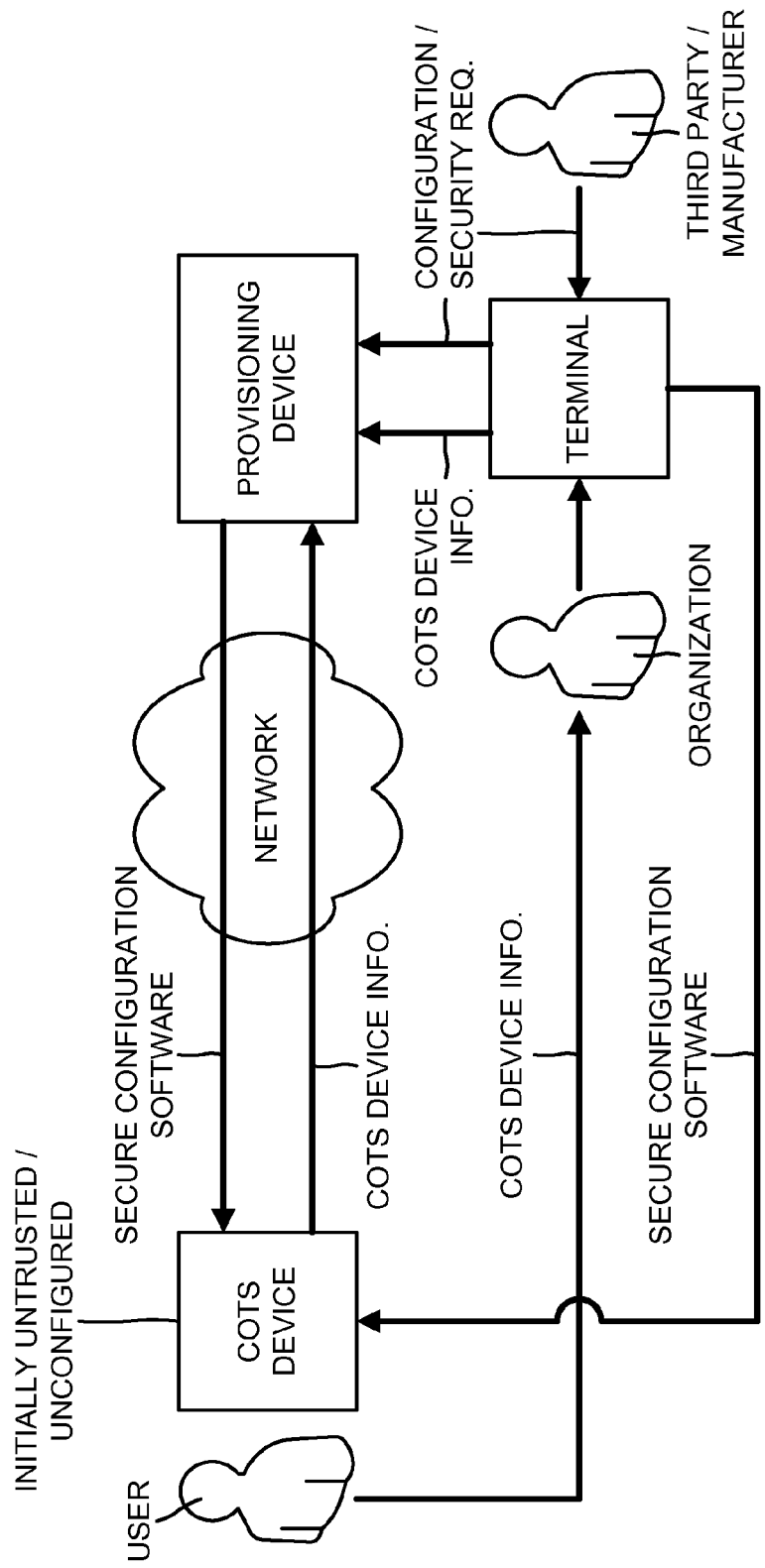
FIG. 1 is a diagram of an overview of an example implementation described herein.

FIG. 1 is a diagram of an overview of an example implementation described herein. As shown, a COTS device may be associated with a terminal, and may connect to a provisioning device via a network.

The COTS device may include a radiotelephone, a personal communications system (PCS) terminal, a smart phone, a personal digital assistant (PDA), or other types of mobile computation and communication devices. The terminal may include one or more computation and communication devices that may enable a user of the COTS device to provide COTS device information to the provisioning device. The provisioning device may include one or more computation and communication devices that may securely provision the COTS device with secure configuration software. The network may include a wireless access network (e.g., a Long Term Evolution (LTE) network, an evolved high rate packet data (eHRPD) network, etc.), and a core network that includes core network equipment, such as a packet data network (PDN) gateway (PGW), a serving gateway (SGW), a mobility management entity (MME), etc.

As further shown in FIG. 1, the COTS device may initially be a standard device that is not trusted and not configured. For example, the COTS device may include a smart phone that is not configured with customized hardware and/or software components. Such a device may cost significantly less than a smart phone that includes customized hardware and/or software components. A user may purchase the COTS device or an organization (e.g., a government agency, a private company, etc.) may purchase the COTS device on behalf of the user. The user may provide COTS device information to the organization (e.g., a network administrator of the organization). The COTS device information may include identification information associated with the COTS device, such as a mobile equipment identifier (MEID), a mobile device number (MDN), an international mobile equipment identity (IMEI), an electronic serial number (ESN), a password, a token, etc.

The COTS device information may also include information associated with the user (e.g., an account number, a serial number, a telephone number, etc. associated with the user).

The organization may provide the COTS device information to the terminal and may define (e.g., via the terminal) configuration and security requirements for the COTS device. The configuration/security requirements may include information defining software that may be installed on the COTS device; information defining capabilities to enable for the COTS device (e.g., GPS location services, etc.); information defining capabilities to be removed from the COTS device (e.g., services, functionality, etc. to be removed or disabled); information defining an address (e.g., an IP address) of a device (e.g., the provisioning device) from which the COTS device may download secure content (e.g., applications); etc. The terminal may provide the COTS device information and the configuration/security requirements to the provisioning device.

The provisioning device may receive the COTS device information and the configuration/security requirements, and may create secure configuration software based on the COTS device information and/or the configuration/security requirements. The secure configuration software may include, for example, software that configures the COTS device to prevent unauthorized access to the COTS device, disables particular functionality of the COTS device, etc. The provisioning device may securely provide the secure configuration software to the COTS device, via the network. In one example, the provisioning device may include a firmware over the air (FOTA) device and the network may include a wireless access network. In such an arrangement, the FOTA device may securely provide the secure configuration software to the COTS device over the wireless access network.

The COTS device may receive the secure configuration software, and may install the secure configuration software. After installation of the secure configuration software, the COTS device may be trusted by the organization, and the user may utilize the COTS device to access confidential information associated with the organization.

Alternatively, or additionally, the provisioning device may create a secure firmware image based on the COTS device information and/or the configuration/security requirements. The provisioning device may provide the secure firmware image to the COTS device. The secure firmware image may remove an untrusted existing image on the COTS device, and may replace the existing image with the trusted secure firmware image. The secure firmware image may include an image that configures the COTS device to prevent unauthorized access to the COTS device, disables particular functionality of the COTS device, etc.

Alternatively, or additionally, the COTS device may provide the COTS device information directly to the provisioning device via a secure mechanism (e.g., a secure portal). The provisioning device may receive the COTS device information, and may receive the configuration/security requirements. In one example, the organization may provide the configuration/security requirements to the provisioning device prior to the COTS device providing the COTS device information to the provisioning device. In such an arrangement, the provisioning device may retrieve the previously received configuration/security requirements. The provisioning device may create the secure configuration software based on the COTS device information and/or the configuration/security requirements, and may securely provide the secure configuration software to the COTS device, via the network.

Alternatively, or additionally, the organization, a third party, or a manufacturer may provide the configuration/security requirements to the terminal (e.g., via user input, a compact disk (CD), etc.). The third party may include, for example, a company that creates and sells the configuration/security requirements and/or the secure configuration software. The manufacturer may include, for example, a company that manufactures the COTS device. The manufacturer may create the configuration/security requirements and/or the secure configuration software. In such an arrangement, the COTS device may be connected to the terminal, and may provide the COTS device information directly to the terminal. The terminal may create the secure configuration software based on the COTS device information and/or the configuration/security requirements, and may provide the secure configuration software to the COTS device for installation. Alternatively, or additionally, the terminal may utilize the secure configuration software provided by the third party and/or the manufacturer, and may provide the secure configuration software to the COTS device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
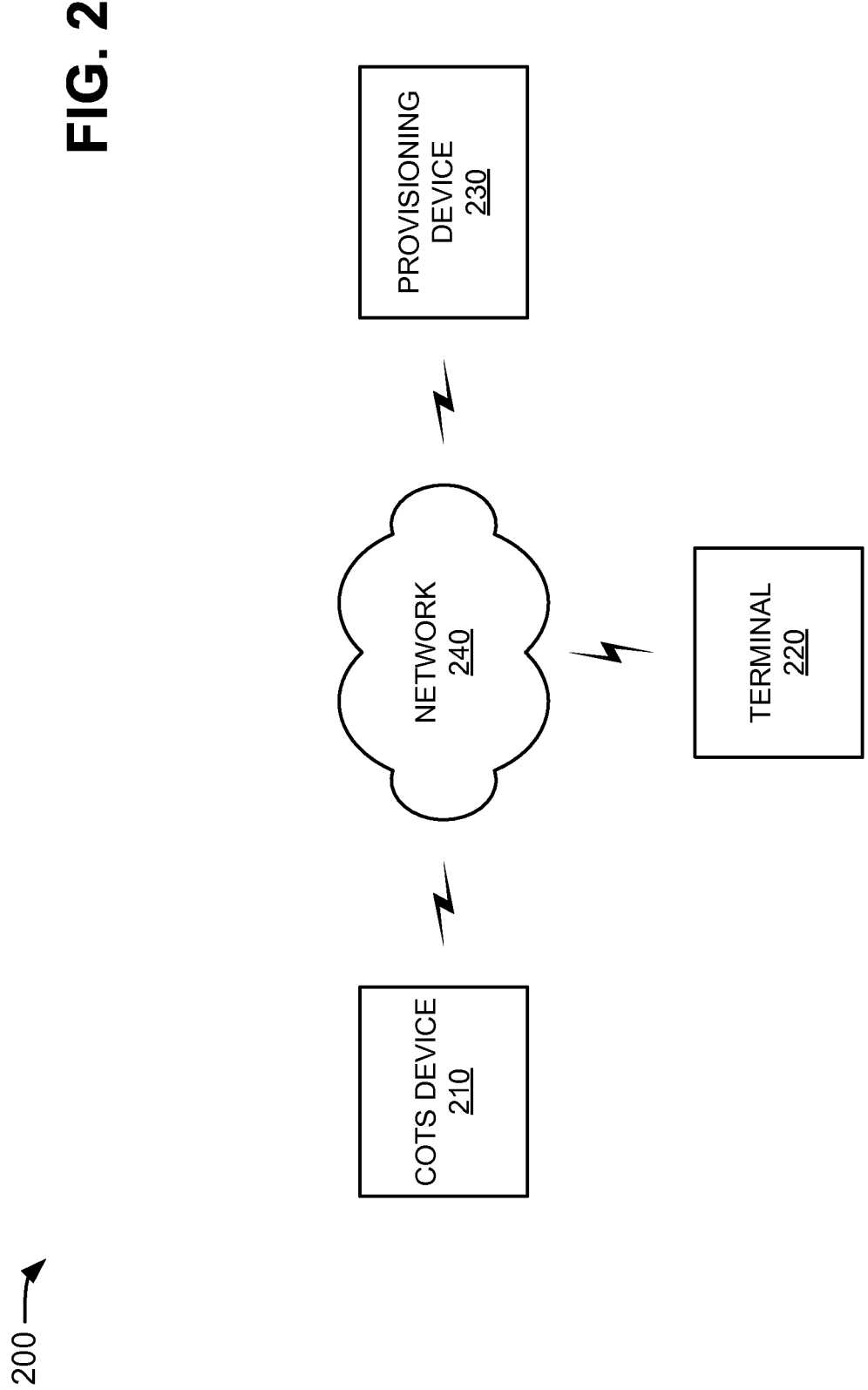
FIG. 2 is a diagram of an example environment in which systems and/or methods described herein may be implemented.

FIG. 2 is a diagram of an example environment 200 in which systems and/or methods described herein may be implemented. As illustrated, environment 200 may include COTS device 210, a terminal 220, a provisioning device 230, and a network 240. The devices and/or the network of environment 200 may interconnect via wired and/or wireless connections or links. A single COTS device 210, terminal 220, provisioning device 230, and network 240 have been illustrated in FIG. 2 for simplicity. In practice, there may be more COTS devices 210, terminals 220, provisioning devices 230, and/or networks 240.

COTS device 210 may include a radiotelephone, a PCS terminal (e.g., that may combine a cellular radiotelephone with data processing and data communications capabilities), a smart phone, a PDA (e.g., that can include a radiotelephone, a pager, Internet/intranet access, etc.), a laptop computer (e.g., with a broadband air card), a tablet computer, or other types of mobile computation and communication devices. In an example implementation, COTS device 210 may include may include a standardized or generic mobile device that does not include customized hardware and/or software components. For example, COTS device 210 may include a mobile device that does not include safeguards that prevent unauthorized access to the device, unsecure software (e.g., mobile applications), and other features (e.g., navigation, GPS components, etc.). Due to its generic nature, COTS device 210 may cost significantly less than a mobile device that includes customized hardware and/or software components. Alternatively, or additionally, COTS device 210 may include a standardized or generic fixed device that does not include customized hardware and/or software components, such as an Internet protocol (IP) telephone, a set-top box (STB), etc.

Terminal 220 may include a laptop computer, a personal computer, a workstation computer, or other types of computation and communication devices. In one example implementation, terminal 220 may receive, from COTS device 210, identification information (e.g., a MDN, an IMEI, a password, a token, etc.) associated with COTS device 210. Terminal 220 may receive, from a user associated with an organization, a third party, or a manufacturer, configuration/security requirements for COTS device 210. Terminal 220 may provide the identification information and the configuration/security requirements to provisioning device 230. Alternatively, or additionally, terminal 220 may create secure configuration software based on the identification information and/or the configuration/security requirements, and may provide the secure configuration software to COTS device 210 for installation.

Provisioning device 230 may include one or more computation and communication devices that may securely provision one or more COTS devices 210. In one example implementation, provisioning device 230 may receive, from terminal 220, identification information, associated with COTS device 210, and configuration/security requirements. Provisioning device 230 may create secure configuration software based on the identification information and/or the configuration/security requirements. Provisioning device 230 may securely provide the secure configuration software to COTS device 210, via network 240. In one example, provisioning device 230 may include a FOTA device.

Alternatively, or additionally, provisioning device 230 may exchange secure content (e.g., audio, video, audio and video, applications, data, etc.) with COTS device 210. In one example, provisioning device 230 may include an application server storing one or more applications that may be requested and downloaded by COTS device 210. COTS device 210 may be configured so that COTS device 210 may only have access to secure content (e.g., content approved by an organization associated with COTS device 210). Provisioning device 230 may permit COTS device 210 to view only secure content or may permit COTS device 210 to view secure and unsecure content.

Network 240 may include a wireless access network (e.g., a LTE network, an eHRPD network, etc.), and a core network that includes core network equipment, such as a PGW, a SGW, a MME, etc. In one example implementation, network 240 may enable provisioning device 230 to securely communicate with COTS device 210 via a secure mechanism, such as a secure portal, a secure protocol, etc.

Although FIG. 2 shows example devices of environment 200, in other implementations, environment 200 may include fewer devices, different devices, differently arranged devices, or additional devices than depicted in FIG. 2. Alternatively, or additionally, one or more devices of environment 200 may perform one or more tasks described as being performed by one or more other devices of environment 200.

Figure 3:
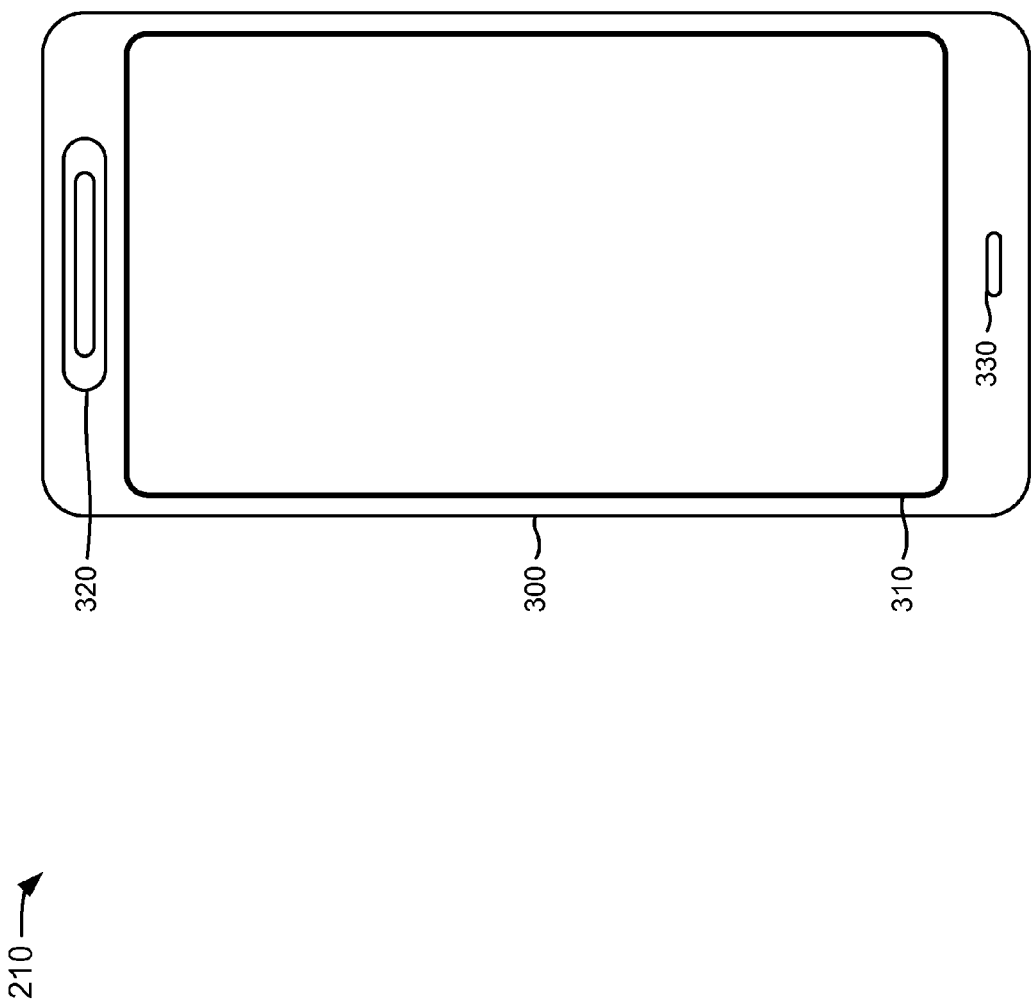
FIG. 3 is a diagram of example external components of a commercial off-the-shelf (COTS) device of the environment depicted in FIG. 2.

FIG. 3 is a diagram of example external components of COTS device 210 (FIG. 2). As shown, COTS device 210 may include a housing 300, a display 310, a speaker 320, and/or a microphone 330.

Housing 300 may protect the components of COTS device 210 from outside elements. Housing 300 may include a structure configured to hold devices and components used in COTS device 210, and may be formed from a variety of materials. For example, housing 300 may be formed from plastic, metal, a composite, etc., and may be configured to support display 310, speaker 320, and/or microphone 330.

Display 310 may provide visual information to the user. For example, display 310 may display text input into COTS device 210, text, images, video, and/or graphics received from another device, and/or information regarding incoming or outgoing calls or text messages, emails, media, games, phone books, address books, the current time, etc. In one implementation, display 310 may include a touch screen display that may be configured to receive a user input when the user touches display 310. For example, the user may provide an input to display 310 directly, such as via the user's finger, or via other input objects, such as a stylus. User inputs received via display 310 may be processed by components and/or devices operating in COTS device 210. The touch screen display may permit the user to interact with COTS device 210 in order to cause COTS device 210 to perform one or more operations.

Speaker 320 may provide audible information to a user of COTS device 210. Speaker 320 may be located in an upper portion of COTS device 210, and may function as an ear piece when a user is engaged in a communication session using COTS device 210. Speaker 320 may also function as an output device for music and/or audio information associated with games and/or video images played on COTS device 210.

Microphone 330 may receive audible information from the user. Microphone 330 may include a device that converts speech or other acoustic signals into electrical signals for use by COTS device 210. Microphone 330 may be located proximate to a lower side of COTS device 210.

Figure 4:
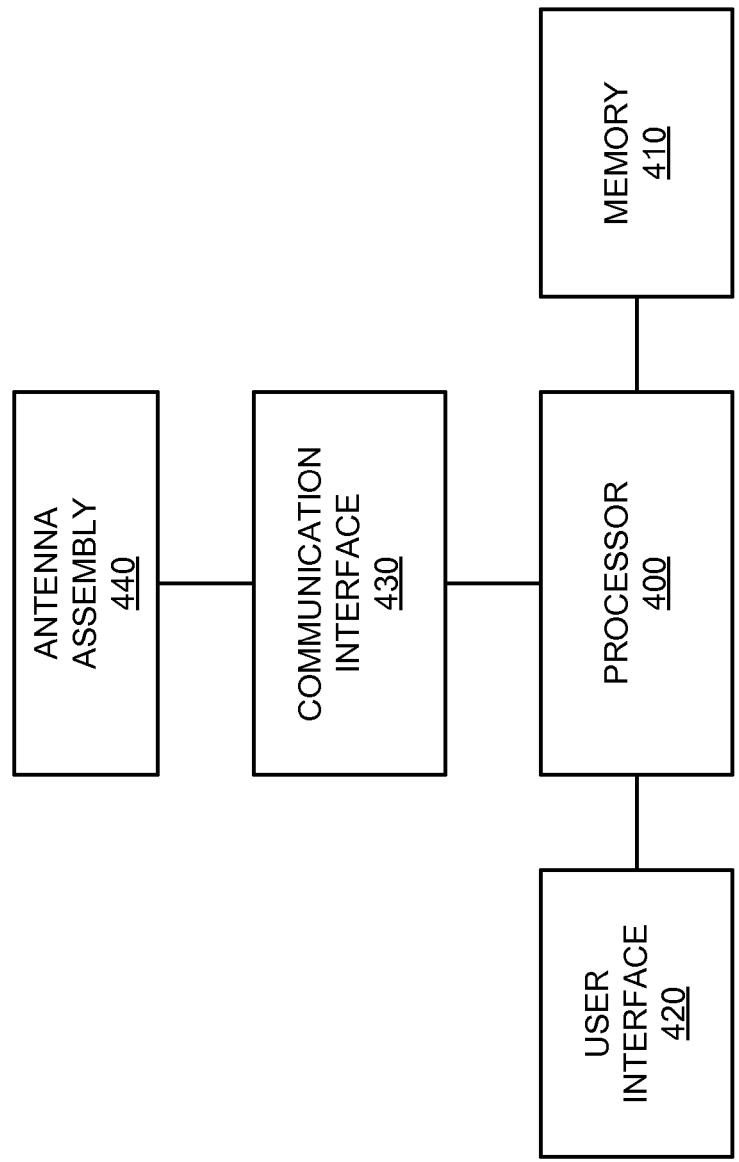
FIG. 4 is a diagram of example internal components of the COTS device of FIG. 3.

FIG. 4 is an example diagram of internal components of COTS device 210 (FIG. 2). As illustrated, COTS device 210 may include a processor 400, memory 410, a user interface 420, a communication interface 430, and/or an antenna assembly 440.

Processor 400 may include one or more processors or microprocessors that interpret and execute instructions. Alternatively, or additionally, processor 400 may be implemented as or include one or more ASICs, FPGAs, or the like.

Memory 410 may include a RAM or another type of dynamic storage device that stores information and instructions for execution by processor 400, a ROM or another type of static storage device that stores static information and instructions for processor 400, and/or some other type of magnetic or optical recording medium and its corresponding drive for storing information and/or instructions.

User interface 420 may include mechanisms for inputting information to COTS device 210 and/or for outputting information from COTS device 210. Examples of input and output mechanisms might include buttons (e.g., control buttons, keys of a keypad, a joystick, etc.) or a touch screen interface (e.g., display 310) to permit data and control commands to be input into COTS device 210; a speaker (e.g., speaker 320) to receive electrical signals and output audio signals; a microphone (e.g., microphone 330) to receive audio signals and output electrical signals; a display (e.g., display 310) to output visual information (e.g., text input into COTS device 210); a vibrator to cause COTS device 210 to vibrate; etc.

Communication interface 430 may include, for example, a transmitter that may convert baseband signals from processor 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As described herein, COTS device 210 may perform certain operations in response to processor 400 executing software instructions contained in a computer-readable medium, such as memory 410. A computer-readable medium may be defined as a non-transitory memory device. A memory device may include space within a single physical memory device or spread across multiple physical memory devices. The software instructions may be read into memory 410 from another computer-readable medium, or from another device via a communication interface 430. The software instructions contained in memory 410 may cause processor 400 to perform processes described herein. Alternatively, hardwired circuitry may be used in place of or in combination with software instructions to implement processes described herein. Thus, implementations described herein are not limited to any specific combination of hardware circuitry and software.

Although FIGS. 3 and 4 show example components of COTS device 210, in other implementations, COTS device 210 may include fewer components, different components, differently arranged components, or additional components than depicted in FIGS. 3 and/or 4. Alternatively, or additionally, one or more components of COTS device 210 may perform one or more other tasks described as being performed by one or more other components of COTS device 210.

Figure 5:
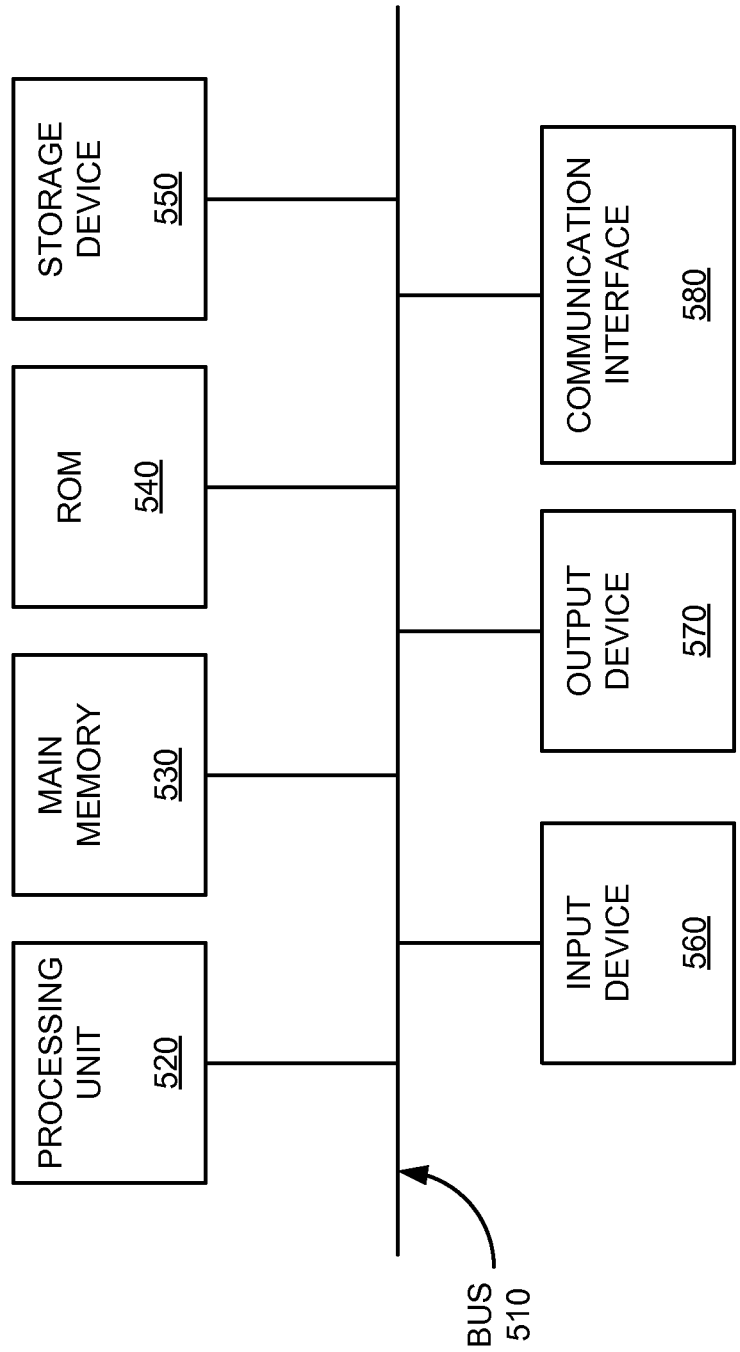
FIG. 5 is a diagram of example components of one or more devices of the environment depicted in FIG. 2.

FIG. 5 is a diagram of example components of a device 500 that may correspond to one or more devices of environment 200. In one example implementation, one or more of the devices of environment 200 may include one or more devices 500 or one or more components of device 500. As illustrated, device 500 may include a bus 510, a processing unit 520, a main memory 530, a ROM 540, a storage device 550, an input device 560, an output device 570, and/or a communication interface 580. Bus 510 may include a path that permits communication among the components of device 500.

Processing unit 520 may include one or more processors, microprocessors, or other types of processing units that may interpret and execute instructions. Main memory 530 may include a RAM or another type of dynamic storage device that may store information and instructions for execution by processing unit 520. ROM 540 may include a ROM device or another type of static storage device that may store static information and/or instructions for use by processing unit 520. Storage device 550 may include a magnetic and/or optical recording medium and its corresponding drive.

Input device 560 may include a mechanism that permits an operator to input information to device 500, such as a keyboard, a mouse, a pen, a microphone, voice recognition and/or biometric mechanisms, etc. Output device 570 may include a mechanism that outputs information to the operator, including a display, a printer, a speaker, etc. Communication interface 580 may include any transceiver-like mechanism that enables device 500 to communicate with other devices and/or systems. For example, communication interface 580 may include mechanisms for communicating with another device or system via a network.

As described herein, device 500 may perform certain operations in response to processing unit 520 executing software instructions contained in a computer-readable medium, such as main memory 530. The software instructions may be read into main memory 530 from another computer-readable medium or from another device via communication interface 580. The software instructions contained in main memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows example components of device 500, in other implementations, device 500 may include fewer components, different components, differently arranged components, or additional components than depicted in FIG. 5. Alternatively, or additionally, one or more components of device 500 may perform one or more other tasks described as being performed by one or more other components of device 500.

Figure 6:
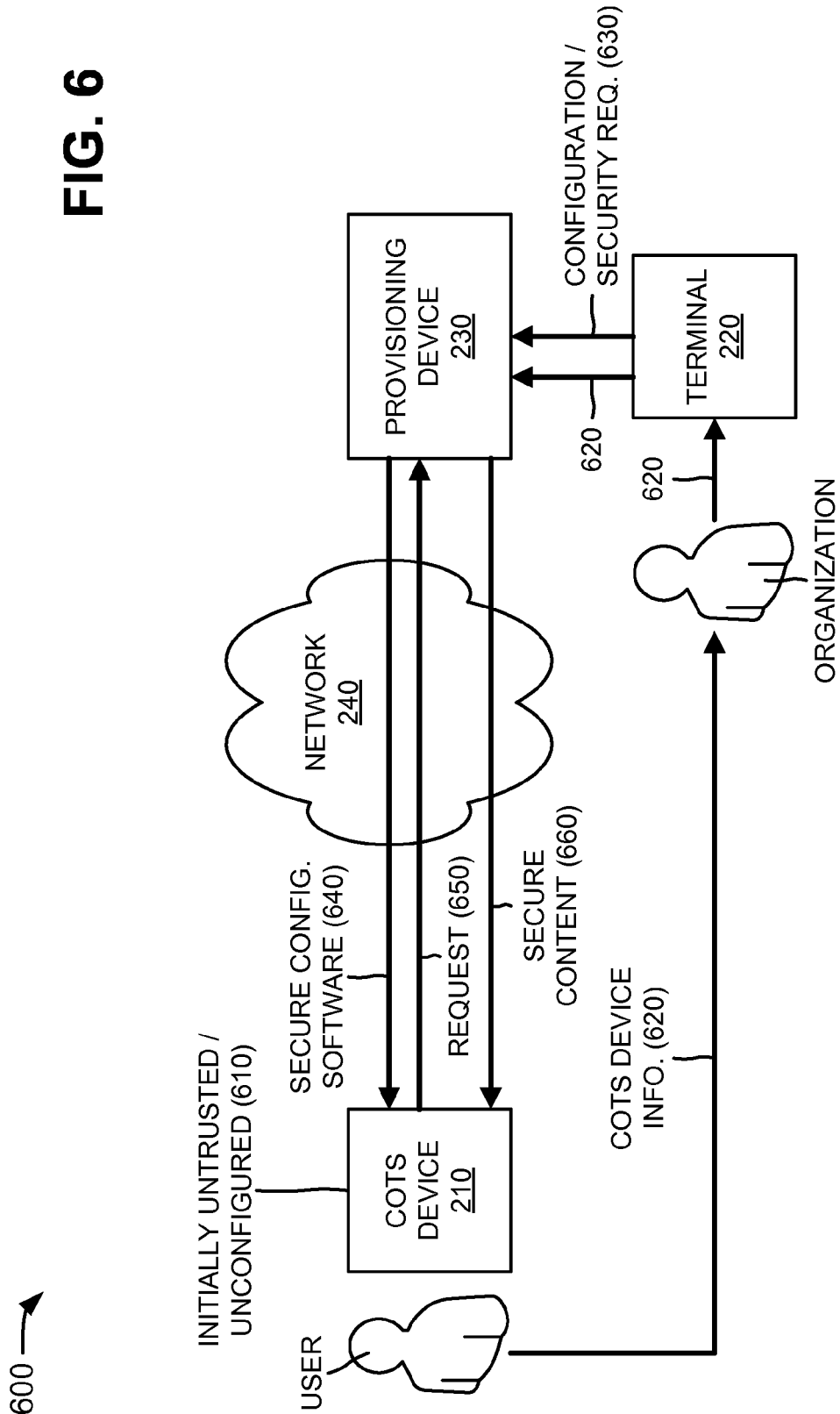
FIG. 6 is a diagram of example operations capable of being performed by an example portion of the environment illustrated in FIG. 2.

FIG. 6 is a diagram of example operations capable of being performed by an example portion 600 of environment 200 (FIG. 2). As shown in FIG. 6, environment portion 600 may include COTS device 210, terminal 220, provisioning device 230, and network 240. COTS device 210, terminal 220, provisioning device 230, and network 240 may include the features described above in connection with one or more of, for example, FIGS. 1-4.

As further shown in FIG. 6, COTS device 210 may initially be a standard device that is not trusted and not configured, as indicated by reference number 610. For example, COTS device 210 may not be configured with customized hardware and/or software components. Such a device may cost significantly less than a device that includes customized hardware and/or software components. A user may purchase COTS device 210 or an organization (e.g., a government agency, a private company, etc.) may purchase COTS device 210 on behalf of the user. The user may provide COTS device information 620 to the organization (e.g., a network administrator of the organization). COTS device information 620 may include identification information associated with COTS device 210, such as a MEID, a MDN, an IMEI, an ESN, a password, a token, etc. associated with COTS device 210. COTS device information 620 may also include subscriber information associated with the user (e.g., an account number, a serial number, a telephone number, etc. associated with the user).

The organization may provide COTS device information 620 to terminal 220, and may define (e.g., via terminal 220) configuration and security requirements 630 for COTS device 210. Configuration/security requirements 630 may include information defining software that may be installed on COTS device 210; information defining capabilities to enable for COTS device 210 (e.g., GPS location services, etc.); information defining capabilities to be removed from COTS device 210 (e.g., services, functionality, etc. to be removed or disabled); information defining an address (e.g., an IP address) of a device (e.g., provisioning device 230) from which COTS device 210 may download secure content (e.g., applications); etc. Terminal 220 may provide COTS device information 620 and configuration/security requirements 630 to provisioning device 230.

Provisioning device 230 may receive COTS device information 620 and configuration/security requirements 630, and may create secure configuration software 640 based on COTS device information 620 and/or configuration/security requirements 630. Secure configuration software 640 may include, for example, software that configures COTS device 210 to prevent unauthorized access to COTS device 210, disables particular functionality of COTS device 210, etc. Provisioning device 230 may securely provide secure configuration software 640 to COTS device 210, via network 240. In one example, provisioning device 230 may include a FOTA device and network 240 may include a wireless access network. In such an arrangement, the FOTA device may securely provide secure configuration software 640 to COTS device 210 over the wireless access network.

COTS device 210 may receive secure configuration software 640, and may install secure configuration software 640. After installation of secure configuration software 640, COTS device 210 may be trusted by the organization, and the user may utilize COTS device 210 to access information permitted by the organization (e.g., from provisioning device 230).

Alternatively, or additionally, provisioning device 230 may create a secure firmware image based on COTS device information 620 and/or configuration/security requirements 630. Provisioning device 230 may provide the secure firmware image to COTS device 210. The secure firmware image may remove an untrusted existing image on COTS device 210, and may replace the existing image with the trusted secure firmware image. The secure firmware image may include an image that configures COTS device 210 to prevent unauthorized access to COTS device 210, disables particular functionality of COTS device 210, etc.

As shown in FIG. 6, COTS device 210 may generate a request 650 for secure and/or unsecure content. For example, COTS device 210 may access a content service provided by provisioning device 230 or another server device, and may provide for display, to the user, a list of available secure and/or unsecure content offered by the content service. The user may select information identifying particular content from the displayed list of available content, and COTS device 210 may receive the selection of the information identifying the particular content. Information identifying the selection of the particular content may be provided in request 650. COTS device 210 may provide request 650 to provisioning device 230, and provisioning device 230 may receive request 650. Based on request 650, provisioning device 230 may determine whether the particular content is secure content 660 (e.g., may be accessed by COTS device 210) or unsecure content (e.g., may not be accessed by COTS device 210). If the particular content is secure content 660, provisioning device 230 may provide secure content 660 to COTS device 210, and COTS device 210 may receive secure content 660. If the particular content is unsecure content, provisioning device 230 may not provide the particular content to COTS device 210, but may provide information indicating that COTS device 210 cannot access the requested content.

In one example scenario, a user of COTS device 210 may preview multiple types of secure configuration software 640 and/or secure firmware images from an application store that COTS device 210 may access. The user may select one of the types of secure configuration software 640 and/or secure firmware images from the application store, and may download the selected application. COTS device 210 may receive the selected application, and may install the selected application. After installation of the selected application, COTS device 210 may be trusted by the organization, and the user may utilize COTS device 210 to access information permitted by the organization (e.g., from provisioning device 230).

Although FIG. 6 shows example components of environment portion 600, in other implementations, environment portion 600 may include fewer components, different components, differently arranged components, or additional components than depicted in FIG. 6. Alternatively, or additionally, one or more components of environment portion 600 may perform one or more other tasks described as being performed by one or more other components of environment portion 600.

Figure 7:
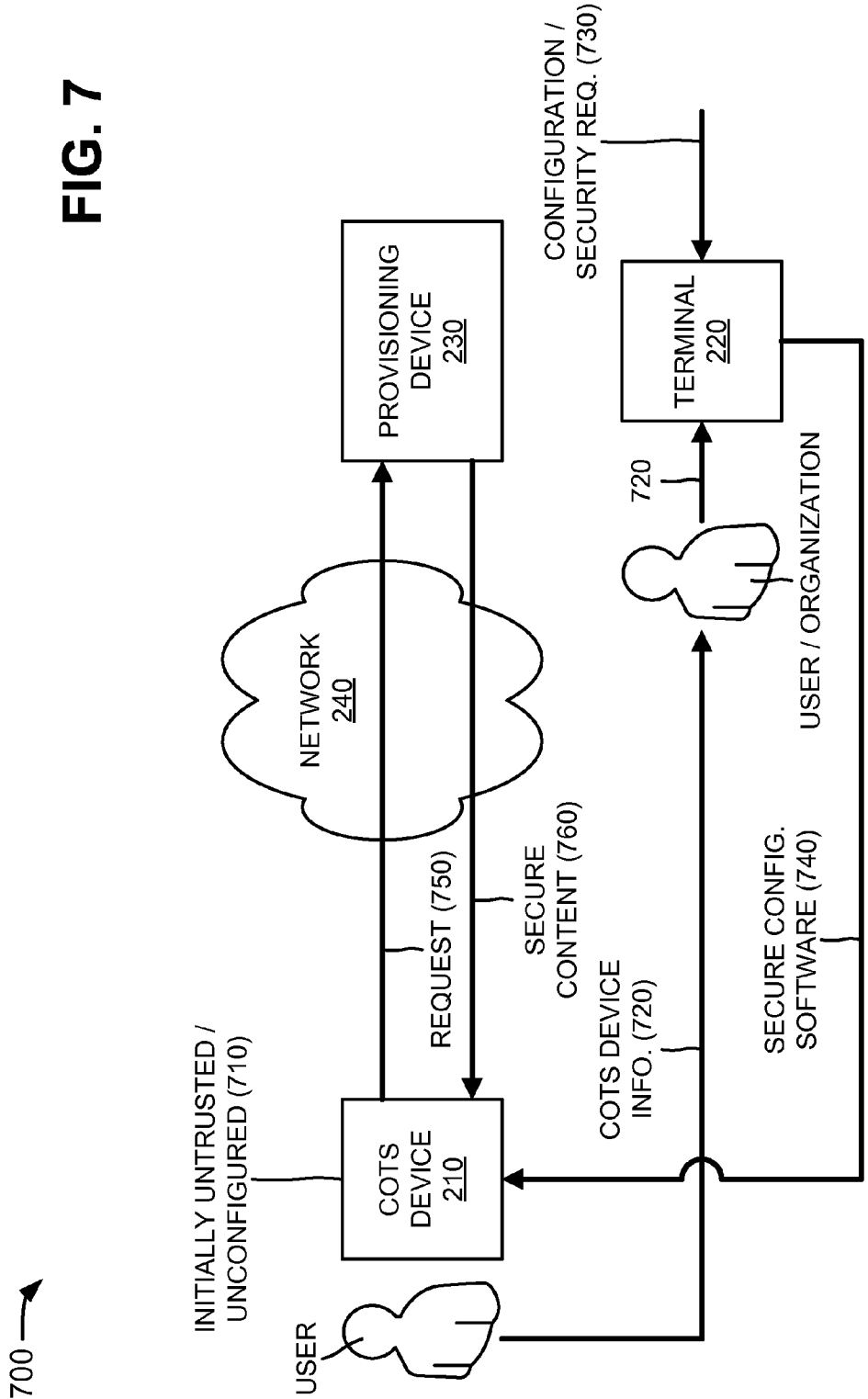
FIG. 7 is a diagram of example operations capable of being performed by another example portion of the environment illustrated in FIG. 2.

FIG. 7 is a diagram of example operations capable of being performed by another example portion 700 of environment 200 (FIG. 2). As shown in FIG. 7, environment portion 700 may include COTS device 210, terminal 220, provisioning device 230, and network 240. COTS device 210, terminal 220, provisioning device 230, and network 240 may include the features described above in connection with one or more of, for example, FIGS. 1-6.

As further shown in FIG. 7, COTS device 210 may initially be a standard device that is not trusted and not configured, as indicated by reference number 710. For example, COTS device 210 may not be configured with customized hardware and/or software components. A user may purchase COTS device 210 or an organization (e.g., a government agency, a private company, etc.) may purchase COTS device 210 on behalf of the user. The user may provide COTS device information 720 directly to the organization (e.g., a network administrator of the organization). COTS device information 720 may include identification information associated with COTS device 210, such as a MEID, a MDN, an IMEI, an ESN, a password, a token, etc. associated with COTS device 210. COTS device information 720 may also include subscriber information associated with the user (e.g., an account number, a serial number, a telephone number, etc. associated with the user).

The organization may provide COTS device information 720 to terminal 220. Alternatively, the user may provide COTS device information 720 to terminal 220 if the user is able to configure COTS device 210 without the organization. In one example, the user may connect COTS device 210 to terminal 220, and terminal 220 may determine COTS device information 720 directly from COTS device 210. The organization may define configuration and security requirements 730 for COTS device 210. Configuration/security requirements 730 may include information defining software that may be installed on COTS device 210; information defining capabilities to enable for COTS device 210 (e.g., GPS location services, etc.); information defining capabilities to be removed from COTS device 210 (e.g., services, functionality, etc. to be removed or disabled); information defining an address (e.g., an IP address) of a device (e.g., provisioning device 230) from which COTS device 210 may download secure content (e.g., applications); etc.

In one example, terminal 220 may receive configuration/security requirements 730 from the organization by accessing a secure organizational web site, and retrieving configuration/security requirements 730 from the web site. Alternatively, or additionally, the organization may provide the user with a computer-readable medium (e.g., a CD ROM, a flash drive, etc.) that includes configuration/security requirements 730. The user may utilize the computer-readable medium to store configuration/security requirements 730 on terminal 220. Alternatively, or additionally, the computer-readable medium may include secure configuration software 740, described below, and the user may store secure configuration software 740 on terminal 220.

Terminal 220 may receive COTS device information 720 and configuration/security requirements 730, and may create secure configuration software 740 based on COTS device information 720 and/or configuration/security requirements 730. Secure configuration software 740 may include, for example, software that configures COTS device 210 to prevent unauthorized access to COTS device 210, disables particular functionality of COTS device 210, etc. Terminal 220 may provide secure configuration software 740 to COTS device 210.

COTS device 210 may receive secure configuration software 740, and may install secure configuration software 740. After installation of secure configuration software 740, COTS device 210 may be trusted by the organization, and the user may utilize COTS device 210 to access information permitted by the organization (e.g., from provisioning device 230).

Alternatively, or additionally, terminal 220 may create a secure firmware image based on COTS device information 720 and/or configuration/security requirements 730. Terminal 220 may provide the secure firmware image to COTS device 210. The secure firmware image may remove an untrusted existing image on COTS device 210, and may replace the existing image with the trusted secure firmware image. The secure firmware image may include an image that configures COTS device 210 to prevent unauthorized access to COTS device 210, disables particular functionality of COTS device 210, etc.

As shown in FIG. 7, COTS device 210 may generate a request 750 for secure and/or unsecure content. For example, COTS device 210 may access a content service provided by provisioning device 230 or another server device, and may provide for display, to the user, a list of available secure and/or unsecure content offered by the content service. The user may select information identifying particular content from the displayed list of available content, and COTS device 210 may receive the selection of the information identifying the particular content. Information identifying the selection of the particular content may be provided in request 750. COTS device 210 may provide request 750 to provisioning device 230, and provisioning device 230 may receive request 750. Based on request 750, provisioning device 230 may determine whether the particular content is secure content 760 (e.g., may be accessed by COTS device 210) or unsecure content (e.g., may not be accessed by COTS device 210). If the particular content is secure content 760, provisioning device 230 may provide secure content 760 to COTS device 210, and COTS device 210 may receive secure content 760. If the particular content is unsecure content, provisioning device 230 may not provide the particular content to COTS device 210, but may provide information indicating that COTS device 210 cannot access the requested content.

Although FIG. 7 shows example components of environment portion 700, in other implementations, environment portion 700 may include fewer components, different components, differently arranged components, or additional components than depicted in FIG. 7. Alternatively, or additionally, one or more components of environment portion 700 may perform one or more other tasks described as being performed by one or more other components of environment portion 700.

Figure 8:
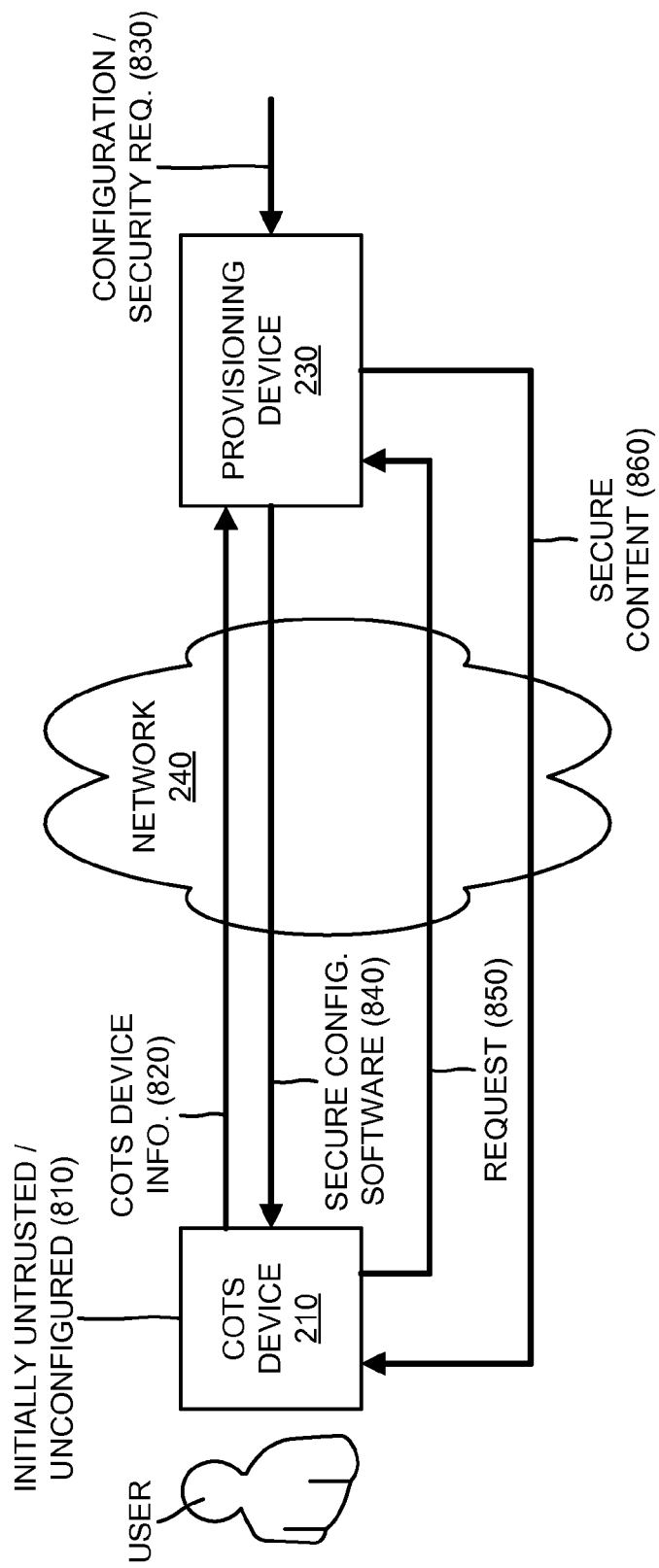
FIG. 8 is a diagram of example operations capable of being performed by still another example portion of the environment depicted in FIG. 2.

FIG. 8 is a diagram of example operations capable of being performed by still another example portion 800 of environment 200 (FIG. 2). As shown in FIG. 8, environment portion 800 may include COTS device 210, provisioning device 230, and network 240. COTS device 210, terminal 220, and network 240 may include the features described above in connection with one or more of, for example, FIGS. 1-7.

As further shown in FIG. 8, COTS device 210 may initially be a standard device that is not trusted and not configured, as indicated by reference number 810. For example, COTS device 210 may not be configured with customized hardware and/or software components. A user may purchase COTS device 210 or an organization (e.g., a government agency, a private company, etc.) may purchase COTS device 210 on behalf of the user. COTS device 210 may establish a secure connection with provisioning device 230 via network 240. For example, provisioning device 230 may provide a secure portal that COTS device 210 may access (e.g., upon proper authentication being provided by the user). The user may instruct COTS device 210 to provide COTS device information 820 to provisioning device 230, via network 240 and the secure connection. COTS device information 820 may include identification information associated with COTS device 210, such as a MEID, a MDN, an IMEI, an ESN, a password, a token, etc. associated with COTS device 210. COTS device information 820 may also include subscriber information associated with the user (e.g., an account number, a serial number, a telephone number, etc. associated with the user).

The organization, associated with the user, may define configuration and security requirements 830 for COTS device 210, and may provide configuration/security requirements 830 to provisioning device 230. Configuration/security requirements 830 may include information defining software that may be installed on COTS device 210; information defining capabilities to enable for COTS device 210 (e.g., GPS location services, etc.); information defining capabilities to be removed from COTS device 210 (e.g., services, functionality, etc. to be removed or disabled); information defining an address (e.g., an IP address) of a device (e.g., provisioning device 230) from which COTS device 210 may download secure content (e.g., applications); etc.

Provisioning device 230 may receive COTS device information 820 and configuration/security requirements 830, and may create secure configuration software 840 based on COTS device information 820 and/or configuration/security requirements 830. Secure configuration software 840 may include, for example, software that configures COTS device 210 to prevent unauthorized access to COTS device 210, disables particular functionality of COTS device 210, etc. Provisioning device 230 may securely provide secure configuration software 840 to COTS device 210, via network 240.

COTS device 210 may receive secure configuration software 840, and may install secure configuration software 840. After installation of secure configuration software 840, COTS device 210 may be trusted by the organization, and the user may utilize COTS device 210 to access information permitted by the organization (e.g., from provisioning device 230).

Alternatively, or additionally, provisioning device 230 may create a secure firmware image based on COTS device information 820 and/or configuration/security requirements 830. Provisioning device 230 may provide the secure firmware image to COTS device 210. The secure firmware image may remove an untrusted existing image on COTS device 210, and may replace the existing image with the trusted secure firmware image. The secure firmware image may include an image that configures COTS device 210 to prevent unauthorized access to COTS device 210, disables particular functionality of COTS device 210, etc.

As shown in FIG. 8, COTS device 210 may generate a request 850 for secure and/or unsecure content. For example, COTS device 210 may access a content service provided by provisioning device 230 or another server device, and may provide for display, to the user, a list of available secure and/or unsecure content offered by the content service. The user may select information identifying particular content from the displayed list of available content, and COTS device 210 may receive the selection of the information identifying the particular content. Information identifying the selection of the particular content may be provided in request 850. COTS device 210 may provide request 850 to provisioning device 230, and provisioning device 230 may receive request 850. Based on request 850, provisioning device 230 may determine whether the particular content is secure content 860 (e.g., may be accessed by COTS device 210) or unsecure content (e.g., may not be accessed by COTS device 210). If the particular content is secure content 860, provisioning device 230 may provide secure content 860 to COTS device 210, and COTS device 210 may receive secure content 860. If the particular content is unsecure content, provisioning device 230 may not provide the particular content to COTS device 210, but may provide information indicating that COTS device 210 cannot access the requested content.

Although FIG. 8 shows example components of environment portion 800, in other implementations, environment portion 800 may include fewer components, different components, differently arranged components, or additional components than depicted in FIG. 8. Alternatively, or additionally, one or more components of environment portion 800 may perform one or more other tasks described as being performed by one or more other components of environment portion 800.

FIG. 9 is a diagram of example operations capable of being performed by another example portion 900 of environment 200 (FIG. 2). As shown in FIG. 9, environment portion 900 may include COTS device 210, terminal 220, provisioning device 230, and network 240. COTS device 210, terminal 220, provisioning device 230, and network 240 may include the features described above in connection with one or more of, for example, FIGS. 1-8.

As further shown in FIG. 9, COTS device 210 may initially be a standard device that is not trusted and not configured, as indicated by reference number 910. For example, COTS device 210 may not be configured with customized hardware and/or software components. A user may purchase COTS device 210 or an organization (e.g., a government agency, a private company, etc.) may purchase COTS device 210 on behalf of the user. The user may provide COTS device information 920 to terminal 220 if the user is able to configure COTS device 210 without the organization. COTS device information 920 may include identification information associated with COTS device 210, such as a MEID, a MDN, an IMEI, an ESN, a password, a token, etc. associated with COTS device 210. COTS device information 920 may also include subscriber information associated with the user (e.g., an account number, a serial number, a telephone number, etc. associated with the user).

In one implementation, the user may connect COTS device 210 to terminal 220, and terminal 220 may determine COTS device information 920 directly from COTS device 210. A third party or a manufacturer may define configuration and security requirements 930 for COTS device 210. The third party may include, for example, a company that creates and sells configuration/security requirements 930 and/or secure configuration software 940 (described below). The manufacturer may include, for example, a company that manufactures COTS device 210. The manufacturer may create configuration/security requirements 930 and/or secure configuration software 940. Configuration/security requirements 930 may include information defining software that may be installed on COTS device 210; information defining capabilities to enable for COTS device 210 (e.g., GPS location services, etc.); information defining capabilities to be removed from COTS device 210 (e.g., services, functionality, etc. to be removed or disabled); information defining an address (e.g., an IP address) of a device (e.g., provisioning device 230) from which COTS device 210 may download secure content (e.g., applications); etc.

In one example, terminal 220 may receive configuration/security requirements 930 from the third party/manufacturer by accessing a secure web site, and retrieving configuration/security requirements 930 from the web site. Alternatively, or additionally, the third party/manufacturer may provide a computer-readable medium (e.g., a CD ROM, a flash drive, etc.) that includes configuration/security requirements 930. The third party/manufacturer may utilize the computer-readable medium to store configuration/security requirements 930 on terminal 220. Alternatively, or additionally, the computer-readable medium may include secure configuration software 940, described below, and the third party/manufacturer may store secure configuration software 940 on terminal 220.

Terminal 220 may receive COTS device information 920 and configuration/security requirements 930, and may create secure configuration software 940 based on COTS device information 920 and/or configuration/security requirements 930. Secure configuration software 940 may include, for example, software that configures COTS device 210 to prevent unauthorized access to COTS device 210, disables particular functionality of COTS device 210, etc. Terminal 220 may provide secure configuration software 940 to COTS device 210.

COTS device 210 may receive secure configuration software 940, and may install secure configuration software 940. After installation of secure configuration software 940, COTS device 210 may be trusted by the organization, and the user may utilize COTS device 210 to access information permitted by the organization (e.g., from provisioning device 230).

Alternatively, or additionally, terminal 220 may create a secure firmware image based on COTS device information 920 and/or configuration/security requirements 930. Terminal 220 may provide the secure firmware image to COTS device 210. The secure firmware image may remove an untrusted existing image on COTS device 210, and may replace the existing image with the trusted secure firmware image. The secure firmware image may include an image that configures COTS device 210 to prevent unauthorized access to COTS device 210, disables particular functionality of COTS device 210, etc.

As shown in FIG. 9, COTS device 210 may generate a request 950 for secure and/or unsecure content. For example, COTS device 210 may access a content service provided by provisioning device 230 or another server device, and may provide for display, to the user, a list of available secure and/or unsecure content offered by the content service. The user may select information identifying particular content from the displayed list of available content, and COTS device 210 may receive the selection of the information identifying the particular content. Information identifying the selection of the particular content may be provided in request 950. COTS device 210 may provide request 950 to provisioning device 230, and provisioning device 230 may receive request 950. Based on request 950, provisioning device 230 may determine whether the particular content is secure content 960 (e.g., may be accessed by COTS device 210) or unsecure content (e.g., may not be accessed by COTS device 210). If the particular content is secure content 960, provisioning device 230 may provide secure content 960 to COTS device 210, and COTS device 210 may receive secure content 960. If the particular content is unsecure content, provisioning device 230 may not provide the particular content to COTS device 210, but may provide information indicating that COTS device 210 cannot access the requested content.

Although FIG. 9 shows example components of environment portion 900, in other implementations, environment portion 900 may include fewer components, different components, differently arranged components, or additional components than depicted in FIG. 9. Alternatively, or additionally, one or more components of environment portion 900 may perform one or more other tasks described as being performed by one or more other components of environment portion 900.

FIG. 10 is a flow chart of an example process 1000 for secure provisioning of COTS devices. In one implementation, process 1000 may be performed by terminal 220 and/or provisioning device 230. Alternatively, or additionally, some or all of process 1000 may be performed by another device or group of devices, including or excluding terminal 220 and/or provisioning device 230.

As shown in FIG. 10, process 1000 may include receiving identification information associated with a COTS device (block 1010), and receiving configuration and security requirements defined for the COTS device (block 1020). For example, in an implementation described above in connection with FIG. 6, the organization may provide COTS device information 620 to terminal 220. COTS device information 620 may include identification information associated with a COTS device 210, such as a MEID, a MDN, an IMEI, an ESN, etc. associated with COTS device 210. The organization may define (e.g., via terminal 220) configuration and security requirements 630 for COTS device 210. Configuration/security requirements 630 may include information defining software that may be installed on COTS device 210; information defining capabilities to enable for COTS device 210; information defining capabilities to be removed from COTS device 210; information defining an address of a device from which COTS device 210 may download secure content; etc. Terminal 220 may provide COTS device information 620 and configuration/security requirements 630 to provisioning device 230.

As further shown in FIG. 10, process 1000 may include creating secure configuration software for the COTS device based on the identification information and the configuration and security requirements (block 1030), and providing the secure configuration software to the COTS device for installation (block 1040). For example, in an implementation described above in connection with FIG. 6, provisioning device 230 may receive COTS device information 620 and configuration/security requirements 630, and may create secure configuration software 640 based on COTS device information 620 and/or configuration/security requirements 630. Secure configuration software 640 may include, for example, software that configures COTS device 210 to prevent unauthorized access to COTS device 210, disables particular functionality of COTS device 210, etc. Provisioning device 230 may securely provide secure configuration software 640 to COTS device 210, via network 240.

Returning to FIG. 10, process 1000 may include receiving a request for secure and/or unsecure content from the COTS device (block 1050), and providing only secure content to the COTS device based on the request (block 1060). For example, in an implementation described above in connection with FIG. 6, COTS device 210 may generate request 650 for secure and/or unsecure content. Information identifying the selection of the particular content may be provided in request 650. COTS device 210 may provide request 650 to provisioning device 230, and provisioning device 230 may receive request 650. Based on request 650, provisioning device 230 may determine whether the particular content is secure content 660 or unsecure content. If the particular content is secure content 660, provisioning device 230 may provide secure content 660 to COTS device 210. If the particular content is unsecure content, provisioning device 230 may not provide the particular content to COTS device 210, but may provide information indicating that COTS device 210 cannot access the requested content.

FIG. 11 is a flow chart of another example process 1100 for secure provisioning of COTS devices. In one implementation, process 1100 may be performed by COTS device 210. Alternatively, or additionally, some or all of process 1100 may be performed by another device or group of devices, including or excluding COTS device 210.

As shown in FIG. 11, process 1100 may include providing COTS device information to a provisioning device (block 1110), and receiving, from the provisioning device, secure configuration software based on the COTS device information (block 1120). For example, in an implementation described above in connection with FIG. 8, COTS device 210 may establish a secure connection with provisioning device 230 via network 240. The user may instruct COTS device 210 to provide COTS device information 820 to provisioning device 230, via network 240 and the secure connection. COTS device information 820 may include identification information associated with COTS device 210, such as a MEID, a MDN, an IMEI, an ESN, etc. associated with COTS device 210. The organization, associated with the user, may provide configuration/security requirements 830 to provisioning device 230. Configuration/security requirements 830 may include information defining software that may be installed on COTS device 210; information defining capabilities to enable for COTS device 210; etc. Provisioning device 230 may create secure configuration software 840 based on COTS device information 820 and/or configuration/security requirements 830. Secure configuration software 840 may include, for example, software that configures COTS device 210 to prevent unauthorized access to COTS device 210, disables particular functionality of COTS device 210, etc. Provisioning device 230 may securely provide secure configuration software 840 to COTS device 210, via network 240.

As further shown in FIG. 11, process 1100 may include installing the secure configuration software (block 1130), and providing for display, based on the secure configuration software, a list of available secure content (block 1140). For example, in an implementation described above in connection with FIG. 8, COTS device 210 may receive secure configuration software 840, and may install secure configuration software 840. After installation of secure configuration software 840, COTS device 210 may be trusted by the organization, and the user may utilize COTS device 210 to access information permitted by the organization. COTS device 210 may generate request 850 for secure and/or unsecure content. In one example, COTS device 210 may access a content service provided by provisioning device 230 or another server device, and may provide for display, to the user, a list of available secure and/or unsecure content offered by the content service.

Returning to FIG. 11, process 1100 may include receiving selection of information identifying particular secure content from the list of available secure content (block 1150), and requesting the particular secure content from the provisioning device based on the selection (block 1160). For example, in an implementation described above in connection with FIG. 8, the user may select information identifying particular content from the displayed list of available content, and COTS device 210 may receive the selection of the information identifying the particular content. Information identifying the selection of the particular content may be provided in request 850. COTS device 210 may provide request 850 to provisioning device 230, and provisioning device 230 may receive request 850. Based on request 850, provisioning device 230 may determine whether the particular content is secure content 860 or unsecure content.

As further shown in FIG. 11, process 1100 may include receiving the particular secure content from the provisioning device based on the request (block 1170). For example, in an implementation described above in connection with FIG. 8, if the particular content is secure content 860, provisioning device 230 may provide secure content 860 to COTS device 210, and COTS device 210 may receive secure content 860. If the particular content is unsecure content, provisioning device 230 may not provide the particular content to COTS device 210, but may provide information indicating that COTS device 210 cannot access the requested content.

Systems and/or methods described herein may enable a COTS device to be securely configured so that the COTS device may become a trusted and secure device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10 and 11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a device, identification information associated with a mobile commercial off-the-shelf (COTS) device;
   receiving, by the device, configuration and security requirements defined for the mobile COTS device;
   creating, by the device, secure configuration software for the mobile COTS device based on the identification information and the configuration and security requirements,
      the secure configuration software including:
         software that prevents the mobile COTS device from accessing unsecure content, and
         software that disables particular functionality of the mobile COTS device;
   providing, by the device, the secure configuration software to the mobile COTS device;
   receiving, by the device and from the mobile COTS device, a request for secure content and unsecure content after the mobile COTS device provides, for display, information identifying the secure content and the unsecure content; and
   providing, by the device and to the mobile COTS device, only the secure content of the secure content and the unsecure content.

2. The method of claim 1, where the identification information includes one or more of:
   a mobile equipment identifier (MEID) associated with the mobile COTS device,
   a mobile device number (MDN) associated with the mobile COTS device,
   an international mobile equipment identity (IMEI) associated with the mobile COTS device,
   an electronic serial number (ESN) associated with the mobile COTS device, or
   information associated with a user of the mobile COTS device.

3. The method of claim 1, where the configuration and security requirements include one or more of:
   information defining software that may be installed on the mobile COTS device,
   information defining capabilities to enable for the mobile COTS device,
   information defining capabilities to disable for the mobile COTS device, or
   information defining an address of the device.

4. The method of claim 1, where the configuration and security requirements are defined by one of:
   a user of the mobile COTS device,
   an organization associated with the user,
   a manufacturer of the mobile COTS device, or
   a third party that creates and sells the configuration and security requirements.

5. The method of claim 1, where the secure configuration software further includes a firmware image that removes and replaces an existing image on the mobile COTS device.

6. A device, comprising:
   a memory; and
   a processor to:
      receive identification information associated with a fixed or mobile commercial off-the-shelf (COTS) device,
      receive configuration and security requirements defined for the fixed or mobile COTS device,
      create secure configuration software for the fixed or mobile COTS device based on the identification information and the configuration and security requirements,
         the secure configuration software including:
            software that prevents the fixed or mobile COTS device from accessing unsecure content, and
            software that disables particular functionality of the fixed or mobile COTS device,
      provide the secure configuration software to the fixed or mobile COTS device,
      receive, from the fixed or mobile COTS device, a request for secure content and unsecure content after the fixed or mobile COTS device provides, for display, information identifying the secure content and the unsecure content, and
      provide, to the fixed or mobile COTS device, only the secure content of the secure content and the unsecure content.

7. The device of claim 6, where the identification information includes one or more of:
   a mobile equipment identifier (MEID) associated with the fixed or mobile COTS device,
   a mobile device number (MDN) associated with the fixed or mobile COTS device,
   an international mobile equipment identity (IMEI) associated with the fixed or mobile COTS device,
   an electronic serial number (ESN) associated with the fixed or mobile COTS device,
   information associated with a user of the fixed or mobile COTS device,
   a password associated with the fixed or mobile COTS device, or
   a token associated with the fixed or mobile COTS device.

8. The device of claim 6, where the configuration and security requirements include one or more of:
   information defining software that may be installed on the fixed or mobile COTS device,
   information defining capabilities to enable for the fixed or mobile COTS device,
   information defining capabilities to disable for the fixed or mobile COTS device,
   information defining an address of the device, or
   a secure firmware image that removes and replaces an existing image on the fixed or mobile COTS device.

9. The device of claim 6, where the configuration and security requirements are defined by one of:
   a user of the fixed or mobile COTS device,
   an organization associated with the user,
   a manufacturer of the fixed or mobile COTS device, or
   a third party that creates and sells the configuration and security requirements.

10. The device of claim 6, where the secure configuration software further includes a firmware image that removes and replaces an existing image on the fixed or mobile COTS device.

11. A method, comprising:
   providing, by a mobile commercial off-the-shelf (COTS) device and to a device, identification information associated with the mobile COTS device;
   receiving, by the mobile COTS device and from the device, secure configuration software that is generated based on the identification information and based on configuration and security requirements defined for the mobile COTS device;
   installing, by the mobile COTS device, the secure configuration software,
      the secure configuration software, when installed, preventing the mobile COTS device from accessing unsecure content and disabling particular functionality of the mobile COTS device;
   providing for display, by the mobile COTS device, a list of available content;
   receiving, by the mobile COTS device, a selection of information identifying secure content and the unsecure content from the list of available content;
   providing, by the mobile COTS device, a request for the secure content and the unsecure content based on the selection; and
   receiving, by the mobile COTS device and based on the request, only the secure content of the secure content and the unsecure content.

12. The method of claim 11, where the identification information includes one or more of:
   a mobile equipment identifier (MEID) associated with the mobile COTS device,
   a mobile device number (MDN) associated with the mobile COTS device,
   an international mobile equipment identity (IMEI) associated with the mobile COTS device,
   an electronic serial number (ESN) associated with the mobile COTS device, or
   information associated with a user of the mobile COTS device.

13. The method of claim 11, where the configuration and security requirements include one or more of:
   information defining software that may be installed on the mobile COTS device,
   information defining capabilities to enable for the mobile COTS device, or
   information defining capabilities to disable for the mobile COTS device.

14. The method of claim 11, where the configuration and security requirements are defined by one of:
   a user of the mobile COTS device,
   an organization associated with the user,
   a manufacturer of the mobile COTS device, or
   a third party that creates and sells the configuration and security requirements.

15. The method of claim 11, where the secure configuration software further removes an existing image on the mobile COTS device.

16. A mobile commercial off-the-shelf (COTS) device, comprising:
   a memory; and
   a processor to:
      provide, to a device, identification information associated with the mobile COTS device,
      receive, from the device, secure configuration software that is generated based on the identification information and based on configuration and security requirements defined for the mobile COTS device,
      install the secure configuration software,
         the secure configuration software, when installed, preventing the mobile COTS device from accessing unsecure content and disabling particular functionality of the mobile COTS device,
      provide, for display, a list of available content,
      receive a selection of information identifying secure content and the unsecure content from the list of available secure content,
      provide a request for the secure content and the unsecure content based on the selection, and
      receive, based on the request, only the secure content of the secure content and the unsecure content.

17. The mobile COTS device of claim 16, where the identification information includes one or more of:
   a mobile equipment identifier (MEID) associated with the mobile COTS device,
   a mobile device number (MDN) associated with the mobile COTS device,
   an international mobile equipment identity (IMEI) associated with the mobile COTS device,
   an electronic serial number (ESN) associated with the mobile COTS device, or
   information associated with a user of the mobile COTS device.

18. The mobile COTS device of claim 16, where the configuration and security requirements include one or more of:
   information defining software that may be installed on the mobile COTS device,
   information defining capabilities to enable for the mobile COTS device, or information defining capabilities to disable for the mobile COTS device.

19. The mobile COTS device of claim 16, where the configuration and security requirements are defined by one of:
- a user of the mobile COTS device,
- an organization associated with the user,
- a manufacturer of the mobile COTS device, or
- a third party that creates and sells the configuration and security requirements.

20. The mobile COTS device of claim 16, where the secure configuration software further removes an existing image on the mobile COTS device.

* * * * *